United States Patent Office 2,791,603
Patented May 7, 1957

2,791,603
PROCESS FOR PREPARING CARBAMATES OF TERTIARY ACETYLENIC CARBINOLS

Abraham Bavley, Brooklyn, and William M. McLamore, Fresh Meadows, N. Y., assignors to Chas. Pfizer & Co., Inc., Brooklyn, N. Y., a corporation of Delaware No Drawing. Application September 23, 1954, Serial No. 457,994

4 Claims. (Cl. 260—463)

This invention relates to a process for preparing carbamates of tertiary carbinols and more particularly to a process for preparing the carbamates of tertiary acetylenic carbinols which are useful in inducing hypnosis in animals and/or protecting them against convulsive seizures. In our copending application, Serial No. 426,589, filed April 29, 1954, of which this application is a continuation in part, there is described a particularly advantageous process for preparing a new class of carbamates of vinyl ethinyl tertiary carbinols. It has now been found that the process described in our aforesaid application may be employed to prepare a wider variety of carbamates of tertiary carbinols than are set forth in that application.

The compounds which are prepared in accordance with the process of this present invention may be classed as carbamates of ethinyl tertiary carbinols conforming to the following structural formula:

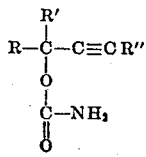

wherein R is an alkyl group having 1 to 8 carbon atoms, alkenyl or haloalkenyl group having from 2 to 8 carbon atoms; R′ is an alkyl group of from 1 to 7 carbon atoms, preferably an ethyl group; and R″ is hydrogen, an alkyl group of from 1 to 6 carbon atoms, or halogen, preferably chlorine or bromine.

We have found that any of the ordinary methods for preparing carbamates fail with tertiary acetylenic carbinols, owing mainly to their ease of dehydration. Furthermore, in our preliminary experiments with methyl vinyl ethinyl carbinol, the highly unsaturated nature of this carbinol led to additional complications and it was not surprising that all of the methods tried initially were unsuccessful.

For example, treatment of methyl vinyl ethinyl carbinol (in excess) with cyanic acid (from cyanuric acid) gave chiefly the allophanate; although a small amount of carbamate may have been formed, we were unable to separate it from the less soluble allophanate. Reaction of the same carbinol with potassium cyanate and acetic acid led apparently to extensive dehydration or rearrangement, and no carbamate could be isolated. Ester interchange between methyl vinyl ethinyl carbinol and ethyl carbamate (urethane) in the presence of sodium ethoxide was slow and incomplete, and no carbamate of the carbinol so treated could be detected in the recovered ethyl carbamate. Moreover, conversion of this carbinol to the mixed carbonate with ethyl chloroformate in pyridine, and treatment of this carbonate with ammonia (gas or aqueous-alcoholic) or lithium amide led only to recovery of the carbonate. The infrared spectrum of the recovered mixed carbonate gave no inclination of carbamate formation.

Two of the synthetic methods reported in the literature were believed to be particularly applicable to tertiary carbinols. In accordance with one of these methods, addition of carbamyl chloride to a pyridine solution of methyl vinyl ethinyl carbinol led to a vigorous reaction and precipitation of pyridine hydrochloride. In a number of experiments, however, only the carbinol could be recovered. Moreover, the yield of recovered carbinol was poor, and the infrared spectrum showed no trace of carbamate. In one experiment a very small amount of solid was isolated, but this proved to be the allophanate of the carbinol treated. The other method, which is purported to be successful with simple tertiary alcohols, involves the conversion of the alcohol to its chloroformate ester with phosgene at low temperature and in the presence of a tertiary amine, followed by treatment of the chloroformate with ammonia. This method was applied to methyl vinyl ethinyl carbinol and to related carbinols in numerous experiments. However, in no case was there a substantial precipitate of amine hydrochloride, even at considerably higher temperatures than those recommended in the literature. Some carbinol was always recovered, and no more than a trace of carbamate could be detected after treatment with ammonia.

We have found, however, that the above class of carbamates can readily be prepared by treating a tertiary carbinol of the general formula:

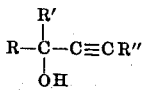

R, R′, R″ being as defined above, with an aromatic chloroformate to form the corresponding aromatic carbonate, followed by treatment of the carbonate with ammonia. The ethinyl tertiary carbinols may in turn be prepared by treating an appropriate ketone, i. e. an alkyl, alkenyl, haloalkenyl ketone with an alkali metal salt of an acetylenic compound as described in our application Serial No. 349,938 filed April 20, 1954, now U. S. Patent No. 2,746,900. Specific examples of such carbinols are:

Methyl β-chlorovinyl ethinyl carbinol
Ethyl β-chlorovinyl ethinyl carbinol
Propyl β-chlorovinyl ethinyl carbinol
Hexyl β-chlorovinyl ethinyl carbinol
Heptyl β-chlorovinyl ethinyl carbinol
Methyl β-chloropropenyl ethinyl carbinol
Ethyl β-chlorooctenyl ethinyl carbinol
Propyl β-chloroheptenyl ethinyl carbinol
Butyl β-bromobutenyl ethinyl carbinol
Hexyl β-bromopentenyl ethinyl carbinol
Heptyl β-bromohexenyl ethinyl carbinol
Methyl β-chlorovinyl propinyl carbinol
Ethyl β-chlorovinyl butinyl carbinol
Propyl β-chlorovinyl octinyl carbinol
Dimethyl ethinyl carbinol
Methyl ethyl ethinyl carbinol
Ethyl propyl ethinyl carbinol
Propyl butyl ethinyl carbinol
Heptyl octyl ethinyl carbinol
Methyl vinyl ethinyl carbinol
Ethyl vinyl ethinyl carbinol
Isopropyl hexenyl ethinyl carbinol
n-Propyl octenyl ethinyl carbinol In accordance with the present invention the aromatic chloroformate is slowly added to a solution of the tertiary carbinol in the presence of a tertiary organic base, preferably one which also acts as a solvent. Suitable bases include triethylamine, dimethyl aniline, coal tar bases, such as pyridine, picolines, collidines, lutidines, quinolines and substituted quinolines, and mixtures thereof. The base is used in an amount sufficient to combine with the hydrogen chloride liberated by the reaction between the tertiary carbinol and the chloroformate, at least one mole of base per mole of carbinol being preferred for best results. Illustrative of the aromatic chloroformates are the following: phenyl chloroformate, alkylated phenyl chloroformates, chlorophenyl chloroformates, nitrophenyl chloroformates, α-naphthyl chloroformate, β-naphthyl chloroformate, and the like. The reaction is preferably conducted under anhydrous conditions with cooling, a reaction time of from about 2 to 5 hours being sufficient in most instances. Upon the addition of water, the aryl carbonate of the tertiary carbinol may be extracted with a water-immiscible solvent, such as ether, chloroform, cyclohexane, benzene and the like. After several extractions of the carbonate with solvent, the solvent extracts may be combined and washed with a suitable mineral acid such as hydrochloric acid or sulfuric acid to remove excess base from the solution, followed by a saturated solution of a salt like sodium chloride or sodium sulfate, containing excess sodium bicarbonate to neutralize and partially dry the combined extracts. The solution containing the aryl carbonate of the ethynyl tertiary carbinol is then conveniently dried with a suitable drying agent, such as anhydrous magnesium sulfate, and filtered. The resulting solution may be used directly for preparation of the carbamate or it may be concentrated to give the crude aromatic carbonate of the tertiary carbinol. The intermediate carbonates so produced may be represented by the following structural formula:

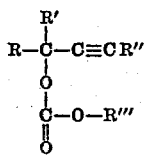

R, R' and R'' having the same significance as previously indicated, and R''' being an aromatic or substituted aromatic group.

The desired carbamates are preferably prepared by treating the above aromatic carbonates with ammonia directly, i. e. without isolation of the carbonate. In this connection, several procedures may be employed. For instance, ammonia may be bubbled slowly through a solution, for example, an ether solution, of the aromatic carbonate at room temperature for about 10 to 20 hours to convert the latter to the corresponding carbamate. Alternatively, the ether solution of the crude aromatic carbonate may be added to liquid ammonia and reacted for 10 to 24 hours, while permitting the ammonia to reflux and evaporate slowly. This method is to be preferred for best results. In still another procedure, the ether solution of aromatic carbonate as above prepared may be concentrated and treated with saturated ethanolic ammonia, and the resultant mixture left at room temperature for about the same time as aforesaid to complete the reaction.

In all of the described procedures, the resulting carbamate may be conveniently taken up in water and ether, and extracted with additional ether to remove the desired product from by-products and impurities. The ether extract may then be washed with sodium hydroxide solution to remove the phenolic by-products of the reaction, after which it is washed with saturated sodium chloride solution. The ether solution is then dried and concentrated to a low volume. Thereafter, the addition of petroleum ether precipitates the carbamate, which occurs as a white solid. It may readily be recrystallized from a mixture of ether and petroleum ether for purification purposes.

The process of this invention may be further understood from the following examples which are given by way of illustration and are not intended as a limitation of the invention.

*Example I.—Phenyl carbonate of ethyl-β-chlorovinyl ethinyl carbinol*

39 g. of phenyl chloroformate (0.249 mole) were added dropwise to a stirred, ice-cooled solution of 39.6 g. ethyl β-chlorovinyl ethinyl carbinol (0.274 mole) in 100 ml. of anhydrous pyridine. Thereafter, the suspension of solid was stirred with cooling for 2 to 3 hours. 150 ml. of water and 150 ml. of ether were added, and the aqueous layer was extracted with several fresh portions of ether. The combined ether extracts were washed with 300 ml. of cold 18% hydrochloric acid in two portions and finally with saturated sodium chloride solution containing excess sodium bicarbonate. The ether layer was dried with anhydrous magnesium sulfate and filtered. At this point the ether solution may be used directly for preparation of the carbamate or it may be concentrated to give the crude phenyl carbonate of the ethyl-β-chlorovinyl ethinyl carbinol.

*Example II.—Carbamate of ethyl-β-chlorovinyl ethinyl carbinol*

Ammonia was bubbled slowly during eight hours through an ether solution of the phenyl carbonate of ethyl β-chlorovinyl ethinyl carbinol prepared as in Example I from 6.6 g. of the carbinol. Although a condenser was used, most of the ether was lost during this treatment. The reddish, semi-solid residue was taken up in water and additional ether, and the aqueous layer was extracted with several further portions of ether. The combined ether extracts were washed twice with 50 ml. portions of 2.5% sodium hydroxide solution and finally with saturated sodium chloride solution. The ether solution was dried with anhydrous magnesium sulfate, then concentrated to a low volume and diluted with petroleum ether. The carbamate precipitated at this point as a white solid, which was recrystallized from ether-petroleum ether to give 5.2 g. of colorless leaflets, M. P. 98.5–99.5° C. A further 0.3 g. was obtained from the filtrate; yield 5.5 g. (64% from the carbinol). The analytical sample was recrystallized from methanol-water as heavier crystals, M. P. 98.5–99.5° C.

*Analysis.*—Calc'd for: $C_8H_{10}O_2NCl$: percent C, 51.21; percent H, 5.37; percent N, 7.47. Found: percent C, 51.43; percent H, 5.40; percent N, 7.42.

*Example III.—Carbamate of ethyl β-chlorovinyl ethinyl carbinol*

1700 ml. of an ether solution of the crude phenyl carbonate from 390 g. of ethyl β-chlorovinyl ethinyl carbinol, prepared as in Example I, were added to 2500 ml. of liquid ammonia and kept at the reflex temperature of the mixture for 6.5 hours. Ammonia was allowed to evaporate overnight with stirring. The residual solution was treated as in Example II, and the carbamate was obtained as 338.9 g. (65.8% yield) of colorless leaflets, M. P. 100–101.2° C.

*Example IV.—Carbamate of ethyl β-chlorovinyl ethinyl carbinol*

The crude phenyl carbonate from 19.8 g. of ethyl β-chlorovinyl ethinyl carbinol, obtained by careful concentration of an ether solution prepared in accordance with Example I, was taken up in 100 ml. of saturated ethanolic ammonia and left at room temperature overnight. The red solution which resulted was concentrated under mild conditions and the carbamate obtained as in Example II. The yellowish crystals weighted 10.9 (42.4% yield) and had M. P. 97–98° C.

*Example V.—Carbamate of methyl β-chlorovinyl ethinyl carbinol*

13.1 g. of methyl β-chlorovinyl ethinyl carbinol (0.10 mole) were treated in accordance with the procedure of Example I to form the corresponding carbonate of the methyl homolog. The crude phenyl carbonate thus formed was then added to liquid ammonia as in Example III to convert the intermediate mixed carbonate to the carbamate. After treating the residual solution as in Example II, the desired carbamate was obtained in an amount of 8.38 g. (48.3% yield), M. P. 92.9–93° C.

*Analysis.*—Calc'd for: C₇H₈O₂NCl: percent C, 48.43; percent H, 4.65; percent N, 8.07. Found: percent C, 48.25; percent H, 4.70, percent N, 8.07.

*Example VI.—carbamate of n-propyl β-chlorovinyl ethinyl carbinol*

15.9 g. of n-propyl β-chlorovinyl ethinyl carbinol (0.10 mole) was treated as in Example V to obtain 5.86 g. (29.1% yield) of the corresponding carbamate, M. P. 63.9–64.8° C.

*Aanalysis.*—Calc'd for: C₉H₁₂O₂NCl: percent C, 53.60; percent H, 6.00; percent N, 6.95. Found: percent C, 53.62; percent H, 6.11; percent N, 6.93.

*Example VII.—Carbamate of i-propyl-β-chlorovinyl ethinyl carbinol*

In accordance with the procedure of Example V, 15.9 g. of i-propyl-β-chlorovinyl ethinyl carbinol (0.10 mole) were employed to prepare 1.3 g. of the corresponding carbamate (6.5% yield); M. P. 91–92° C.

*Analysis.*—Calc'd for: C₉H₁₂O₂NCl: percent C, 53.60; percent H, 6.00; percent N, 6.95. Found: percent C, 53.61; percent H, 5.90; percent N, 7.17.

*Example VIII.—Carbamate of methyl ethyl ethinyl carbinol*

9.8 g. of methyl ethyl ethinyl carbinol (0.10 mole) was treated in accordance with Example V to obtain 3.0 g. (21.2% yield) of the corresponding carbamate, M. P. 55.8–57° C.

*Analysis.*—Calc'd for: C₇H₁₁O₂N: percent C, 59.55; percent H, 7.85; percent N, 9.92. Found: percent C, 59.40; percent H, 7.75; percent N, 9.67.

*Example IX.—Carbamate of methyl vinyl ethinyl carbinol*

19.2 g. of methyl vinyl ethinyl carbinol (0.20 mole) was treated in accordance with Example V to obtain 19.9 g. (71.6% yield) of the corresponding carbamate, M. P. 56.6–57.4° C.

*Analysis.*—Calc'd for: C₇H₉O₂N: percent C, 60.42; percent H, 6.52; percent N, 10.07. Found: percent C, 60.41; percent H, 6.60; percent N, 10.16.

*Example X.—Carbamate of ethyl vinyl ethinyl carbinol*

16.5 g. of ethyl vinyl ethinyl carbinol (0.15 mole) was treated in accordance with Example V to obtain 12.7 g. (55.2% yield) of the corresponding carbamate, M. P. 39.2–40° C.

*Analysis.*—Calc'd for: C₈H₁₁O₂N: percent C, 62.72; percent H, 7.24; percent N, 9.15. Found: percent C, 62.46; percent H, 7.12; percent N, 9.16.

*Example XI.—Carbamate of isopropyl vinyl ethinyl carbinol*

10.1 g. of isopropyl vinyl ethinyl carbinol (0.081 mole) was treated in accordance with Example V to obtain 3.4 g. (25.0% yield) of the corresponding carbamate, M. P. 44.5–45.5° C.

*Analysis.*—Calc'd for: C₉H₁₃O₂N: percent C, 64.65; percent H, 7.83; percent N, 8.38. Found: percent C, 64.41; percent H, 7.72; percent N, 8.43.

*Example XII.—Carbamate of methyl ethyl chloroethinyl carbinol*

13.3 g. of methyl ethyl chloroethinyl carbinol (0.10 mole) was treated in accordance with Example V to obtain 2.95 g. (16.8% yield) of the corresponding carbamate, M. P. 98–99° C.

*Analysis.*—Calc'd for: C₇H₁₀O₂NCl: percent C, 47.87; percent H, 5.74; percent N, 7.98. Found: percent C, 47.94; percent H, 5.79; percent N, 8.00.

In general, the carbamates of this invention are white solids which are readily adapted for therapeutic use. Marked hypnosis has been observed in animals to which they have been administered, and the compounds have been found to protect such animals effectively against convulsive seizures. This permits certain treatment of animals which would not be possible without the use of an hypnotic agent. As previously pointed out, the toxicity of the compounds has been found to be low, and no harmful pharmacological effects have been observed as a result of their administration.

The above compounds may be employed in a variety of medicinal dosage forms, that is, they may be incorporated with various inert pharmaceutical carriers such as solid diluents, oils, etc., or with biologically active materials, in the form of tablets, capsules, elixirs, injectable solutions and the like. Because they are solids, they are particularly suitable for the manufacture of tablets for administration by the oral route. In general, the oral dosage forms may be sweetened and flavored with various materials of the type normally employed for that purpose.

When incorporated in such medicinal dosage forms the compounds may be present in concentrations ranging from about 0.5% by weight to about 90% by weight of the composition. Lower concentrations are generally not advisable since the volume of material which must be administered becomes excessive.

Resort may be had to such modifications and equivalents as fall within the scope of the invention and the scope of the appended claims.

What is claimed is:

1. A process for the preparation of the carbamate of a tertiary acetylenic carbinol which comprises treating a compound having the formula:

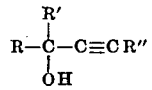

wherein R is selected from the group consisting of alkyl groups having from 1 to 8 carbon atoms, alkenyl, chloralkenyl and bromoalkenyl groups having from 2 to 8 carbon atoms; R' is an alkyl group of from 1 to 7 carbon atoms; and R" is selected from the group consisting of hydrogen, alkyl groups of from 1 to 6 carbon atoms, chlorine and bromine; with an aromatic chloroformate, and reacting the resulting product with ammonia.

2. The process of claim 1 wherein the aromatic chloroformate is phenyl chloroformate.

3. The process of claim 1 wherein phenyl chloroformate is reacted with the tertiary carbinol in the presence of a tertiary organic base to form the phenyl carbonate of said carbinol, and the said carbonate is reacted with liquid ammonia.

4. In a process for the preparation of the carbamate of an ethinyl tertiary carbinol, the step of treating a compound having the formula:

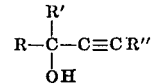

wherein R is selected from the group consisting of alkyl groups having from 1 to 8 carbon atoms, alkenyl, chloroalkenyl and bromoalkenyl groups having from 2 to 8 carbon atoms; R' is an alkyl group of from 1 to 7 carbon atoms; and R" is selected from the group consisting of hydrogen, alkyl groups of from 1 to 6 carbon atoms, chlorine and bromine; with an aromatic chloroformate to form the corresponding carbonate thereof.

References Cited in the file of this patent

UNITED STATES PATENTS

| 1,658,231 | Dox et al. | Feb. 7, 1928 |
| 2,517,965 | Bohl | Aug. 8, 1950 |
| 2,627,524 | Malkemus | Feb. 3, 1953 |

FOREIGN PATENTS

| 505,421 | Belgium | Sept. 15, 1951 |